J. GORMAN.
PIPE COUPLING.
APPLICATION FILED APR. 8, 1918.
1,357,974.
Patented Nov. 9, 1920.
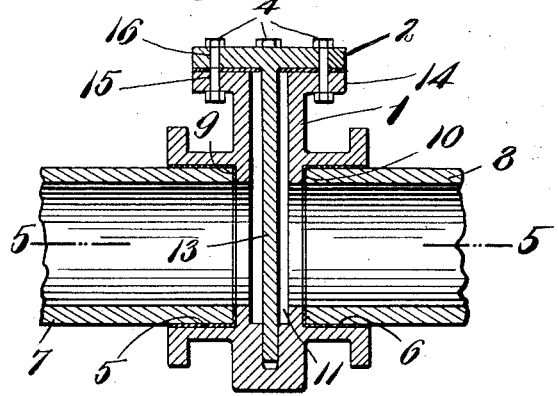
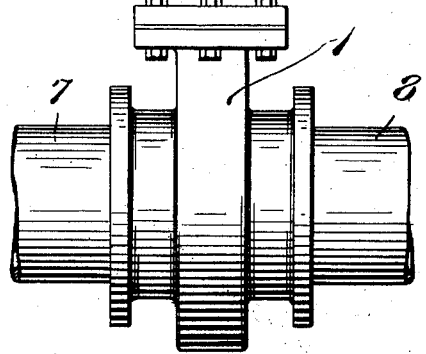
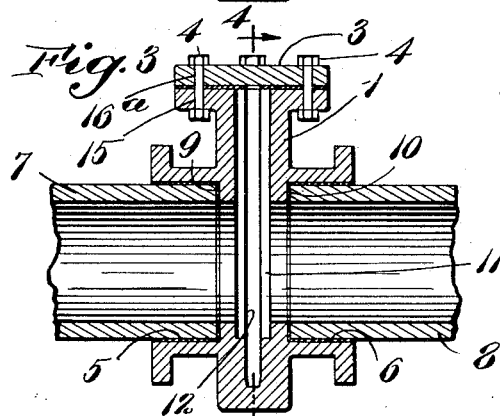
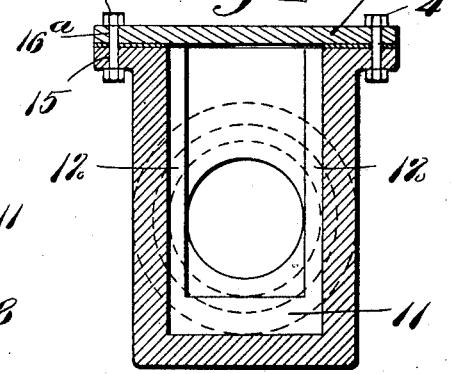
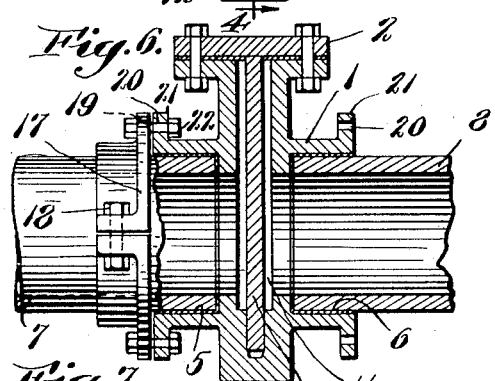
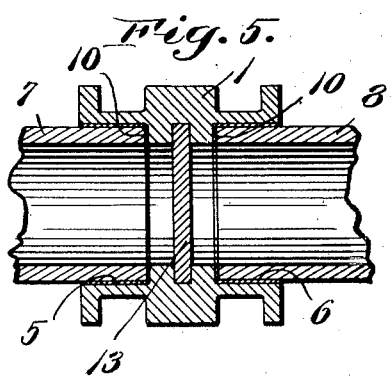
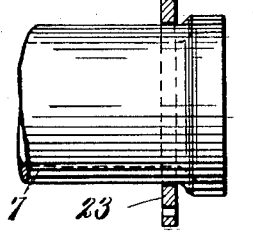
Inventor
John Gorman
by Arthur J. Randall
atty.

UNITED STATES PATENT OFFICE.

JOHN GORMAN, OF BOSTON, MASSACHUSETTS.

PIPE-COUPLING.

1,357,974.   Specification of Letters Patent.   Patented Nov. 9, 1920.

Application filed April 8, 1918. Serial No. 227,188.

*To all whom it may concern:*

Be it known that I, JOHN GORMAN, a citizen of the United States, residing at Boston, in the county of Suffolk and State of Massachusetts, have invented certain new and useful Improvements in Pipe-Couplings, of which the following is a specification.

My invention relates to pipe couplings and particularly to pipe couplings for water mains and the like.

In building pipe-lines for water it has heretofore been necessary to fully complete the line before any use whatever could be made thereof. Also in repairing a pipe-line of this kind it has heretofore been necessary to shut off the whole of the line from the supply in case of a break and while repairing the latter. My invention has for its object to provide a coupling apparatus for use in pipe-lines, particularly water mains and the like, which will make it possible during the operation of installing the same, to use the completed portions of the line before the latter is wholly completed, or to use a portion of an installed line while another part thereof is undergoing repairs.

To these ends my invention consists of a coupling apparatus of the character described comprising a body made with two ports adapted at their ends to be connected with the ends of two pipe sections. Between these two ports the body is made with a transverse chamber into which said ports open, said chamber having a mouth or opening at the exterior of the body over which either one of two covers or closure members may be fastened by means of bolts, or other selected fastening devices, so that either closure may be substituted for the other at will. One of these two closures is constructed with a gate or wall, preferably integral therewith, adapted to enter said transverse chamber and cut off communication between the two pipe sections when said closure is placed in position to close the outer end of said chamber. The other cover or closure is made plain, that is, it is not made with a gate or wall to enter the chamber so that when it occupies its position over the outer end of the latter it merely closes said outer end, leaving free communication between the two pipe sections.

In the accompanying drawings:

Figure 1 is a central longitudinal sectional view of a pipe coupling constructed in accordance with my invention, showing the gated closure in position.

Fig. 2 is an elevation of the pipe coupling shown in Fig. 1.

Fig. 3 is a view like Fig. 1 but showing the plain cover or closure in position.

Fig. 4 is a section on line 4—4 of Fig. 3.

Fig. 5 is a section one line 5—5 of Fig. 1.

Figs. 6 and 7 show modifications.

My new pipe coupling apparatus comprises a body 1; two closures or covers 2 and 3, and cover fastening devices 4, the latter being herein shown as bolts.

The body 1 is made with two ports 5 and 6 adapted at their outer ends to receive the ends of pipe sections 7 and 8 which abut at their inner ends against shoulders 9 and 10 provided within said body near the inner ends of said ports 5 and 6.

Between the two ports 5 and 6 the body 1 is made with a chamber 11 having parallel guideways 12 at each side thereof in the form of grooves adapted to receive the sides of a gate or wall 13 which is preferably cast integral with the cover 2. This chamber 11, as well as each groove 12, has one end thereof opening upon the exterior of the body so that when the cover 2 is removed, or placed in position, the gate 13 can be slid into, or out of, the grooves 12 as it is shoved into or drawn out of said chamber. The body 1 is made with a flange 14 surrounding the mouth of the chamber 11, and this flange is formed with a series of bolt holes 15 which are positioned and spaced to register with correspondingly positioned and spaced bolt holes 16 and 16ª provided, respectively, through covers 2 and 3. Thus the two covers are made to be interchangeable, that is, either can be applied to the body and secured thereon in position to close the outer end of chamber 11 by means of bolts 4, and the latter not only serve to hold the covers in position, but the gate 13 also when cover 2 is in place.

When my new coupling apparatus is used in connection with the construction of a new pipe-line, a number of said couplings is permanently installed in the line, said couplings being distributed at intervals throughout the length of said line. When the couplings are first installed the cap 2 having the gate or wall on it is used on each until the next coupling is installed with its gated cover in place when the cover 2 of the preceding coupling is removed and the cover 3 substituted. Thus it will be clear that completed sections of the pipe line that are closed in by the last gated coupling may be opened up for use before the whole of the line is completed. That is, so long as there is one coupling with its gated cover in place between the open end of the line and the supply, that portion of the line back of said gated coupling may be maintained in communication with the supply.

When my new pipe coupling is used in repairing a broken line, or in making alterations in or additions to a pipe line already installed and constructed as heretofore, it is installed in the line between the break and the supply, or between the point where the line is to be opened for alteration or addition, with its gated cover in place so that the pipe line may be continued in use up to the point where the coupling is located while the repairs or alterations are being effected. When the repairs or alterations are completed the plain lid or cover 3 of the coupling is substituted for the gated lid or cover 2 after which the whole system is free to be used.

It will thus be seen that my invention is not a valve but that it is primarily a coupling apparatus, the essential idea of whose construction and mode of operation involves the provision of two interchangeable covers or closures for the transverse interior chamber, one of said covers closing only the outer end of said chamber and the other cover being a double closure which not only closes the outer end of the chamber but also cuts off communication between the two pipe sections joined by the coupling. In this connection it is to be noted that while I have shown the wall or gate as integral with the cover 2 said wall or gate need not be made integral with, or even be connected with, said cover so long as it is removably confined within the chamber by said cover.

In case of a break or leak in a pipe line provided at intervals with couplings having their chambers closed by plain covers 3 as described, the line can be quickly repaired without requiring the whole of the latter to be put out of use during the repair operations as has heretofore been necessary. Also, by installing one of my new couplings in a pipe line originally constructed, as heretofore, without such couplings, the same can be repaired or added to with ease and despatch without requiring the whole of the line to be put out of use, and when such repairs or additions have been completed the body 1 with its plain cover may be left in position without adding materially, if at all, to the cost of the repairs or additions for the reason that the coupling above described is easily installed and is of very simple and inexpensive construction.

In some cases it may be desirable to provide means for fastening the coupling to the end of the pipe that is connected with the supply. When such is required I may resort to the construction shown in Figs. 6 and 7. In Fig. 6 I have shown the pipe 7, which may be the pipe connected with the supply, as provided with a two-part flange 17 clamped securely on said pipe by means of bolts 18. This flange 17 is made with a series of bolt holes 19 positioned and spaced to register with bolt holes 20 provided through flanges 21 on body 1, said holes receiving bolts 22 by means of which the two flanges are fastened securely together. If the body 1 is applied to the bell end of pipe 7, as shown in Fig. 7, then a one-piece ring 23 formed with bolt holes 24 may be used as shown.

What I claim is:

1. A pipe coupling comprising a body formed with two ports for connection with the ends of two pipes and with a chamber intermediate said ports with which the inner ends of the latter communicate, said chamber being extended at one side only to the exterior of the body so as to provide an entrance and exit; a removable closure wholly covering said entrance and exit made upon one side thereof with a gate adapted to occupy said chamber and shut off communication between said ports, and means separably fastening said closure to said body.

2. A pipe coupling comprising a one-piece body formed with two ports for connection with the ends of two pipes and with a chamber intermediate said ports with which the inner ends of the latter communicate, said chamber being extended at one side only to the exterior of the body so as to provide an entrance and exit; a removable closure plate covering said entrance and exit and made upon one side thereof with an integral perpendicular gate occupying said chamber and shutting off communication between said ports, and means removably fastening said closure plate to said body.

3. A pipe coupling apparatus comprising a one-piece body formed with two short axially alined ports and with a chamber intermediate said ports with which the inner ends of the latter communicate, said chamber being extended at one side only to the exterior of the body so as to provide an entrance and exit; two removable and interchangeable closures for said entrance and exit, one of which is made plain and the other of which is made with a gate adapted to occupy position within said chamber between said ports to shut off communication between the latter, and bolts for removably fastening either of said closures to said body.

4. The combination with a pipe coupling apparatus comprising a one-piece body formed with two short axially alined ports and with a chamber intermediate said ports with which the inner ends of the latter communicate, said chamber being extended at one side only to the exterior of the body so as to provide an entrance and exit; two removable and interchangeable closures for said entrance and exit, one of which is made plain and the other of which is made with an integral gate adapted to occupy position within said chamber between said ports to shut off communication between the latter; bolts for removably fastening either of said closures to said body; of a flange attachable to the end of a pipe, and bolts for fastening said flange to said body to hold the end of said pipe within one of said sockets.

5. The combination with a pipe coupling apparatus comprising a one-piece body formed with two axially alined ports and with a chamber intermediate said ports with which the inner ends of the latter communicate, said chamber being extended at one side only to the exterior of the body so as to provide an entrance and exit and said ports being each formed at its outer end with a socket to receive the end of a pipe; two removable and interchangeable closures for said entrance and exit, one of which is made plain and the other of which is made with a gate adapted to occupy position within said chamber between said ports to shut off communication between the latter; bolts for removably fastening either of said closures to said body; of a flange made up of a plurality of segments adapted to be applied to a pipe near one end thereof; bolts for fastening said flange segments together and clamping them on to said pipe, and bolts for fastening said flange to said body to hold the end of said pipe within one of said sockets.

JOHN GORMAN.